United States Patent Office 3,842,161
Patented Oct. 15, 1974

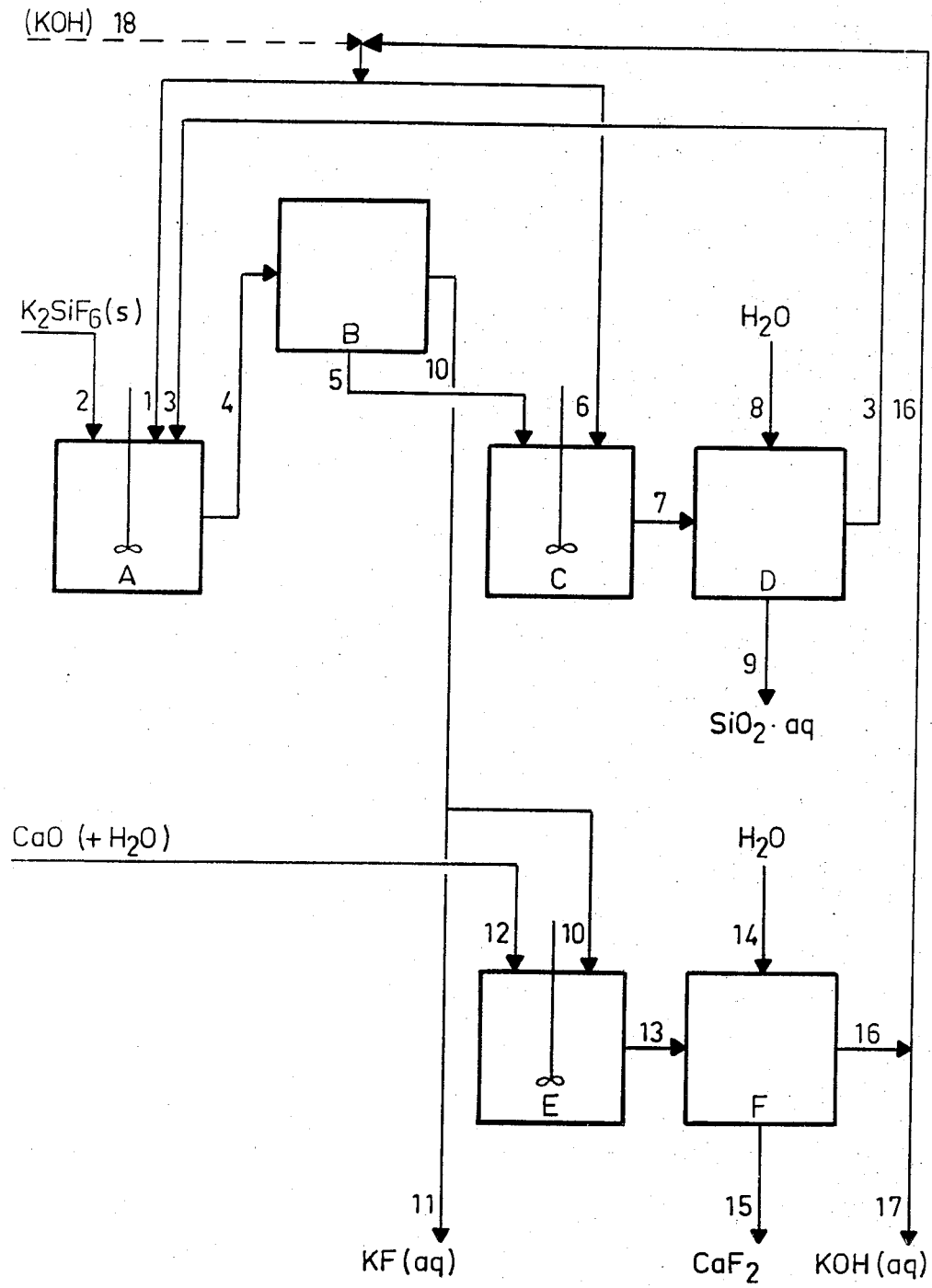

3,842,161
METHOD OF REFINING THE FLUORINE OBTAINED AS A BY-PRODUCT IN THE FERTILIZER INDUSTRY
Rolf Hyoky, Pori, Finland, assignor to Kemira Oy, Helsinki, Finland
Filed Nov. 29, 1972, Ser. No 310,512
Claims priority, application Finland, Dec. 13, 1971, 3,446
Int. Cl. C01b 33/12
U.S. Cl. 423—339                     6 Claims

ABSTRACT OF THE DISCLOSURE

Method of treating potassium silico fluoride to form a potassium fluoride solution and a silica precipitate, in which in a first stage potassium hydroxide solution is mixed with solid potassium silico fluoride in a molar ratio of the former to the latter of less than 4 under conditions wherein potassium fluoride solution and silica precipitate still containing some undissolved potassium silico fluoride are formed, the solution is separated from the precipitate and the precipitate is treated with a quantity of potassium hydroxide solution such that the total molar quantity for both stages of potassium hydroxide to potassium silico fluoride is 4, silica is filtered from the mother liquor, the mother liquor is returned to the first stage and, optionally, at least a portion of the potassium fluoride solution obtained from the first stage is reacted with metal oxides or hydroxides to form fluorides of low solubility in water and a potassium hydroxide solution, the latter of which is recirculated to the decomposition of the potassium silico fluoride.

---

The present invention relates to a method according to which the by-product fluorine obtained in the fertilizer industry can be converted into commercially valuable metal fluorides. According to the method of the invention silica and potassium hydroxide, known as useful substances in the chemical industry, also are are obtained.

Of the fluorine used in the industry the major portion is obtained by processing fluorite ($CaF_2$). The price of fluorite is however continuously increasing while the known high-quality sources are running out. In recent times increasing attention therefore has been paid to the utilization of the fluorine contained in the phosphate raw material used in the fertilizer industry. For instance in Finland several hundred thousands of tons of apatite containing from 3 to 3.3 percent of fluorine are used yearly. The recovery of such a quantity of fluorine is of great importance also from the standpoint of environment protection, since it has been found that fluorine containing gasses have detrimental effect on i.a. standing wood, particularly on the soft wood species.

When treating raw phosphates with concentrated mineral acids or evaporating the phosphoric acid resulting from such treatment, silico tetra fluoride ($SiF_4$), hydrogen fluoride (HF) and water vapor are liberated as gasses. In practice the silico tetra fluoride and the hydrogen fluoride are absorbed in water, giving rise to the following reactions:

(1)     $3SiF_4 + 2H_2O \rightarrow 2H_2SiF_6 + SiO_2$
(2)     $SiF_4 + 2HF \rightarrow H_2SiF_6$ The silica is removed from the resulting silico hydrofluoric acid e.g. by filtration. By recirculating the silico hydrofluoric acid solution in a gas scrubber its concentration may in practice be increased up to about 25 percent by weight.

Several methods have been developed for further treatment both of the silico tetrafluoride gas and the silicohydrofluoric acid solution, viz:

decomposition of the silico hydrofluoric acid with ammonia and the further utilization of the resulting ammonium fluoride (U.S. Pat. 3,128,152, 3,195,979 and 3,316,060);
decomposition of the silico hydrofluoric acid with sulphuric acid (U.S. Pats. 3,218,124 and 3,218,127);
pyrolysis of the silico tetrafluoride (U.S. Pat. 2,819,151 and British Pat. 793,054);
decomposition of an alkali silico fluoride with the corresponding alkali hydroxide to form an alkali fluoride, yielding sodium fluoride as the final product (Indian Pats. 112,456 and 108,376).

The prior known methods present numerous difficulties or they are not economical and thus have failed to find wider commercial acceptance. The separation of the silica, corrosion, the arrangement of the recirculation of chemicals, impurity of the product, and a low degree of recovery are among the difficulties encountered.

The method of the present invention essentially eliminates the above disadvantages and allows the preparation of commercially valuable metal fluorides, potassium hydroxide and active silica.

The characteristics of the method according to the present invention appear from the appended Claims. According to the invention the starting material consists of potassium silico fluoride prepared by methods per se prior known and having a high degree of purity.

A prior known method of preparing potassium silico fluoride (U.S. Pats. 2,556,064 and 2,853,363) is based on the reaction:

(3)     $H_2SiF_6 + 2KCl \rightarrow K_2SiF_6 + 2HCl$

The resulting potassium silico fluoride sludge is filtered and washed, whereby it is ready to be used as the raw material for the method according to the present invention.

The Indian Pat. 108,376 discloses a method where potassium silico fluoride and hot potassium hydroxide solution are reacted to form insoluble silica and soluble potassium fluoride according to the following equation:

(4)     $H_2SiF_6 + 4KOH \rightarrow 6KF + SiO_2 + 2H_2O$

According to said method sodium fluoride is next precipitated from the KF solution with sodium hydroxide according to reaction (5)

(5)     $KF + NaOH \rightarrow NaF + KOH$

One of the disadvantages of the described method is the dissolution of the silica in the KF solution if a high potassium silico fluoride conversion—above 99 percent—and a KF concentration of more than 30 percent in the solution are desired, or, if a silica content in the KF solution is desired to be avoided, the conversion of the potassium silico fluoride according to reaction (4) remains incomplete, resulting in fluorine and potassium losses and an impure silica product.

The utilization of sodium hydroxide for the precipitation of the fluorine from the solution presents the disadvantage that the product—sodium fluoride—is relatively readily soluble in water, whereby the precipitation remains incomplete and the resulting potassium hydroxide solution will still contain a considerable quantity of sodium fluoride.

It has also been proposed to utilize a solution of potassium carbonate for the decomposition of the potassium silico fluoride, according to reaction (6):

(6)     $K_2SiF_6 + 2K_2CO_3 \rightarrow 6KF + SiO_2 + CO_2$

This method admittedly results in a pure KF solution, but the conversion remains incomplete when a solution concentration of the above mentioned order is attempted.

The method according to the present invention is based on the observation made during our laboratory research and process tests at pilot plant scale, that concentrated— over 30 percent—potassium hydroxide solution, and silica, can be prepared as very pure products by decomposing potassium silico fluoride with pure potassium hydroxide solution in two or optionally more different stages. To the first stage is introduced the solid potassium silico fluoride, and less than the stoichiometric amount of the potassium hydroxide solution to satisfy the reaction (4). Thus a portion of the fed potassium silico fluoride remains unhydrolyzed, whereas the conditions in the liquid phase at equilibrium of reaction (4) are such, that very little dissolved silica is present in the solution. The precipitate of the first stage, containing potassium fluoride and silica, is passed to a second stage together with an additional quantity of potassium hydroxide. The total amount of the two potassium hydroxide fractions fed to both stages corresponds to a molar ratio $KOH/K_2SiF_6$ of 4. The liquid conditions in the second stage at equilibrium of reaction (4) are such, that the potassium silico fluoride is completely hydrolyzed, and dissolved silica will be present in the liquid. The silica precipitate is removed from the reaction liquid for instance by filtering. The mother solution and washing water are returned to the first stage, where a major portion of the dissolved silica precipitates from the solution. With respect to the purity of the silica it is important that the potassium hydroxide solutions do not contain metals forming fluorides of low solubility, which could precipitate together with the silica.

The KF solution separated from the first decomposition stage can be utilized for the preparation of solid KF and/or treated to remove the fluorine from the solution, with a metal oxide or hydroxide forming a fluoride of very low solubility in water. This allows the regeneration of a potassium hydroxide solution with a very low content of dissolved metal fluoride. Metal oxides or hydroxides suitable for this purpose include for instance the oxides and hydroxides of the alkaline earth metals. The precipitation of fluorine from the KF solution for instance with calcium takes place according to the following reaction:

(7)  $2KF + CaO + H_2O \rightarrow CaF_2, 2KOH$
(8)  $2KF + Ca(OH)_2 \rightarrow CaF_2 + 2KOH$ The resulting metal fluoride is separated from the solution as a product, for instance by filtration. The solution, which can be obtained as a very pure potassium hydroxide solution, is suitable to be used for the decomposition of the potassium silico fluoride.

The accompanying drawing presents a flow diagram of the process acording to the invention. According to this flow diagram, KOH is introduced through line 1 into a reactor A simultaneously with the introduction of $K_2SiF_6$ through a line 2, while the mother liquor of the silica filter and the silica washing water are returned through a line 3. The reacted sludge is passed through a line 4 into a clarifier B, in which the solution and the precipitate are separated. The settled precipitate is removed from the bottom of the clarifier through a line 5 into a reactor C, with the simultaneous introduction to the same through a line 6 of KOH solution in a such quantity that the total quantity of KOH fed to reactors A and B will be equivalent to the quantity of $K_2SiF_6$ fed to reactor A.

The silica sludge from reactor C is passed through a line 7 to a filter D, where the precipitate is separated from the mother liquor, washed with water from a line 8, and removed from the system through a line 9. The filtrate and the washing water are returned through a line 3 into the reactor A, The clarifier solution from clarifier B is passed through a line 10 to a reactor E, supplied simultaneously through a line 12 with for instance lime (CaO or $Ca(OH)_2$). The sludge issuing from E is passed through a line 13 to a filter F where the precipitate is collected. This is washed with water from a line 14 and removed through a line 15 for instance to be dried into the finished product. The mother liquor removed from filter F through a line 16 contains potassium hydroxide. A portion of this solution is returned through line 1 to reactor A, while another portion is returned through line 6 to reactor C. Potassium hydroxide solution may be removed from the system also through a line 17. Similarly potassium fluoride solution may be removed through a line 11.

To those versed in the art it is obvious, that in the case the fluorine compound of low solubility, precipitated in reactor F, does not contain potassium in a quantity corresponding to the quantity of the potassium introduced to the liquid circulation with the potassium silico fluoride, potassium hydroxide solution will accumulate in the circulation. Therefore potassium must be removed from the liquid circulation as the product of the process, in the form of a solution of either potassium hydroxide and/or a potassium fluoride, at such a rate that the total amount of the potassium quantities removed from the system will correspond to the potassium quantity supplied to the system with the potassium silico fluoride. Thus also water will be removed from the system. This water can be made up with the washing waters of the silica and metal fluoride precipitates. As a result of the solution removal the enrichment of impurities in the liquid circulation is prevented. It is also obvious, that in case a quantity of potassium exceeding the quantity introduced with the potassium silico fluoride is removed from the liquid circulation, the difference must be made up with a corresponding quantity of potassium as potassium hydroxide through a line 18.

The different stages of the process according to the invention may be carried out in simple apparatuses, working at atmospheric pressure. The purity of the products can be brought up to satisfy the highest commercial requirements. The efficiency of fluorine recovery is over 99 percent.

As the method thus provides a possibility to process silico hydrofluoric acid to valuable metal fluorides, and potassium chloride to potassium fluoride and/or hydroxide, it becomes, also in an economical sense, more desirable than before progressively to increase the recovery of fluorine i.a. in the fertilizer industry, and thus to prevent the passage of the undesirable fluorine to the environment.

EXAMPLE

The following test was carried out in the apparatus according to the accompanying diagram:

Reactor A was continuously fed with 210 kgs. per hour of potassium silico fluoride and simultaneously with 431 kgs. per hour of circulated solution (together with washing waters) from filter D, containing 8.5 percent of F, 21.5 percent of $K_2O$ and 0.6 percent of $SiO_2$, as well as with a portion (710 kgs. per hour) of the solution from filter F containing 24.5 percent of KOH, 1.0 percent of F and 0.03 percent of $SiO_2$. The temperature of the reactor was 85° C. and the average retention time therein was 35 minutes. The sludge issuing from the reactor was passed to clarifier B from which 1,125 kgs. per hour of clear solution was obtained. The solution contained 29.2 percent of KF, 0.08 percent of $SiO_2$, and presented a pH of 8.9.

From the bottom of the clarifier was separated 227 kgs. per hour of precipitate containing 44.3 kgs. per hour of unhydrolyzed $K_2SiF_6$. The precipitate was passed into reactor C together with 179 kgs. per hour of solution from filter F. The retention time in the reactor was 35 minutes, and the temperature 85° C. The discharged sludge was filtered, and the precipitate washed with 250 kgs. per hour of pure water. The amount of washed precipitate was 245 kgs. per hour. After drying at 110° C., 24 percent by weight of the precipitate was left. The dry substance contained 94.5 percent of $SiO_2$ and 3.4 percent of $K_2SiF_6$. Of the original quantity of $K_2SiF_6$, 99.2 percent was hydrolyzed.

The solution obtained from the clarifier was mixed in reactor E with 159 kgs. per hour of burnt lime containing 0.25 percent of $SiO_2$. The retention time was 20 minutes, and the temperature about 80° C. The precipitate obtained from the reactor was filtered and dried. The quantity of dry product was 224 kgs. per hour and it contained 98.5 percent of $CaF_2$, 0.6 percent of $K_2O$, 0.45 percent of $SiO_2$ and 0.2 percent of $H_2O$. The solution, including the washing water (330 kgs. per hour), was obtained in a quantity of 1,314 kgs. per hour. It contained 24.5 percent of KOH. In the hydrolyzation of potassium silico fluoride, 425 kgs. per hour of this solution was left unused.

Evaporation of the solution issuing from clarifier B resulted in a solid product containing 99.4 percent of KF, 0.27 percent of $SiO_2$, 0.0012 percent of $Fe_2O_3$, 0.0005 percent of $Cr_2O_3$ and 0.35 percent of $H_2O$. No other substances were detected by X-ray spectrography.

The solution obtained from filter F was once more treated with lime to remove the fluorine still contained therein. Evaporation and drying resulted in solid substance containing 99.7 percent of KOH, less than 0.1 percent of $SiO_2$, and less than 0.01 percent of $CaF_2$.

What is claimed is:

1. In the method of processing the fluorine obtained as a by-product in the fertilizer industry, by treating potassium silico fluoride with a hot solution containing a multiple molar quantity of potassium hydroxide, to form a potassium fluoride solution and a silica precipitate, the improvement comprising in a first stage mixing potassium hydroxide solution with solid potassium silico fluoride at a molar ratio of 2.5 to 3.5, a pH of 7.5 to 9.5 and a temperature of 75 to 85° C. whereby principally potassium fluoride solution and silica precipitate still containing some undissolved potassium silico fluoride are formed, separating pure potassium fluoride solution from the first stage by clarification, treating the precipitate in a second stage with such a quantity of potassium hydroxide solution that the ratio of the total molar quantity of the potassium hydroxide portions used in both treatment stages to the molar quantity of the potassium silico fluoride introduced will be 4 and a pH of 9.5 to 10.5 and a temperature of 80 to 90° C., separating the silica in the second treatment stage from the mother liquor by filtration, returning the mother liquor to the first stage and recovering potassium fluoride solution as a product from the solution obtained by clarification after the first stage.

2. Method of claim 1, in the improvement in which at least a portion of the recovered potassium fluoride solution is reacted with a metal oxide or hydroxide which forms a fluoride of low solubility in water, whereby said fluoride of low solubility and a potassium hydroxide solution are formed and the potassium hydroxide solution in an amount not exceeding the amount necessary for a continuous recirculation process is recirculated to the decomposition of the potassium silico fluoride.

3. Method as claimed in claim 2, in the improvement in which a quantity of the potassium fluoride obtained by the reaction of potassium silico fluoride with potassium hydroxide is removed which is equivalent to the quantity of potassium introduced as potassium silico fluoride, and the rest of the potassium fluoride is regenerated to form the recirculation base for the decomposition of potassium silico fluoride, by precipitating a simple fluoride of low solubility, with a metal oxide or hydroxide.

4. Method as claimed in claim 2, in the improvement in which the total of potassium fluoride is treated with the metal oxide or hydroxide, and from the resulting circulation base potassium hydroxide is separated in a quantity equivalent to the quantity of potassium introduced as potassium hydroxide.

5. Method as claimed in claim 1, in the improvement in which the retention time at each stage is from ¼ to ½ hour.

6. Method as claimed in claim 1, in the improvement in which the metal for forming the fluoride of low solubility is selected from the group consisting of magnesium, calcium, strontium and barium.

References Cited

FOREIGN PATENTS 647,395   12/1950   Great Britain ........ 423—490

OTHER REFERENCES

Byrns, "Fluosilicic Acid", Kirk-Othmer, vol. 9, 2nd ed. pp. 655–657.

OSCAR R. VERTIZ, Primary Examiner

E. R. CROSS, Assistant Examiner

U.S. Cl. X.R.

423—490